United States Patent [19]

Murayama et al.

[11] Patent Number: 4,851,027
[45] Date of Patent: Jul. 25, 1989

[54] GRADUALLY EFFECTIVE, COATED FERTILIZER

[75] Inventors: Toshikazu Murayama; Satoru Hayakawa, both of Yokkaichi; Shuji Takesue, Hofu; Yorozu Yokomori, Yokkaichi, all of Japan

[73] Assignee: Kyowa Hakko Kogyo, Co. Ltd., Tokyo, Japan

[21] Appl. No.: 157,712

[22] Filed: Feb. 19, 1988

[30] Foreign Application Priority Data

Feb. 19, 1987 [JP] Japan .................................. 62-36807
Feb. 19, 1987 [JP] Japan .................................. 62-36808

[51] Int. Cl.⁴ ........................... C05G 3/00; C05G 3/10
[52] U.S. Cl. .................. 71/64.07; 71/64.12; 71/64.13
[58] Field of Search ............... 71/64.01, 64.02, 64.03, 71/64.07, 64.08, 64.11, 64.12, 64.13

[56] References Cited

U.S. PATENT DOCUMENTS 3,388,990 6/1968 Maruta et al. ...................... 71/64.07
3,837,835 9/1974 Weinrotter et al. ................ 71/64.07

FOREIGN PATENT DOCUMENTS 0045188 3/1983 Japan .................................. 71/64.07

Primary Examiner—Ferris H. Lander
Attorney, Agent, or Firm—Antonelli, Terry & Wands

[57] ABSTRACT

By coating a solid fertilizer with a coating material comprising an aqueous emulsion of resin as the main component to form a resin film having a glass transition temperature of 60° C. or higher; or by coating a solid fertilizer with a coating material comprising an aqueous emulsion of a thermoplastic resin and a melamine resin, and heating the coated fertilizer at 70° C. or higher; a gradually-effective, coated fertilizer having a distinguished gradual releasability and strong resistance to caking, which have been so far regarded as difficult to be obtained in an aqueous emulsion system, can be prepared.

6 Claims, 4 Drawing Sheets

GRADUALLY EFFECTIVE, COATED FERTILIZER

BACKGROUND OF THE INVENTION

This invention provides a gradually effective, coated fertilizer and is used in the field of the fertilizer industry.

Generally, chemical fertilizers are immediately effective and it is difficult to maintain the effect of fertilization for a long time. Much fertilization as once made has such disadvantage as high salt concentration disturbance upon crops and water pollution due to leaking of fertilizer. To overcome the disadvantages, gradually effective fertilizers coates with various resins have been so far proposed.

In order to prepare gradually effective, coated fertilizers by spray-coating, the following three coating resin systems are usually suitable for the coating material.

(1) A resin solution dissolved in organic solvent,
(2) An aqueous solution of a water-soluble resin, and
(3) An aqueous emulsion of resin In case of preparation of a coated fertilizer with the above-mentioned coating resin systems, various problems arise.

That is, in case of (1), the raw material cost is higher, and there are fears of air pollution and fires during the preparation of fertilizers owing to the use of an organic solvent. In recovering the solvent, facility therefor is further required, total facility cost increasing considerably.

In case of (2), the resin is water-soluble, and thus the resin to be used as the protective film has a limit in the function of lowering the velocity of releasing the effective components of a fertilizer into the soil.

In case of (3), there are no problems as encountered in cases of (1) and (2), but the coating material of aqueous emulsion system has the following problems.

① Formation of continuous film:

In the aqueous emulsion of a resin, fine resin particles are dispersed in water. In order to render the effective components of a fertilizer gradually releasable, it is necessary to coat the fertilizer with a uniform film. To this end, each of the emulsion particles must coalesce to form a satisfactorily continuous film.

② Problem of caking of coated fertilizer grains:

On condition that the coating film has a low glass transition temperature, when the coated fertilizer is exposed to an elevated temperature or a load, for example, when sacks of fertilizer are piled up in the summer, the coated fertilizer grains undergo fusion on the coating film surfaces, resulting in caking.

In order to prevent the caking of the coated fertilizer grains themselves, it is preferable to select a resin system having a high softening temperature, but generally speaking, such a resin system has difficulty in forming the continuous film of ①, and the gradual releasability becomes worse. On the other hand, when the formation of a continuous film is to be facilitated and the gradual releasability is to be improved by means such as lowering the glass transition temperature of resin and adding a film-forming aid or a plasticizer thereto, the coating film is liable to undergo softening and fushion, and coated fertilizer grains are liable to become caking.

Thus, it has been difficult to form a uniformly continuous film and to maintain distinguished gradual-releasability, while preventing caking of the coated vfertilizer grains.

As a result of extensive studies to solve these problems, it has been found that said problems can be solved by using a coating material comprising an aqueous emulsion of a resin as the main component and having a glass transition temperature of 60° C. or higher, or by using a coating material which is prepared by using an aqueous emulsion of a thermoplastic resion together with a melamine resin and subjecting the coated fertilizer to heat treatment at 70° C. or higher. The present invention has been based on these findings.

SUMMARY OF THE INVENTION

The present invention provides a gradually effective, coated fertilizer obtained by coating a solid fertilizer with a coating material containing an aqueous emulsion of a resin and having a glass transition temperature of 60° C. or higher; or by coating a solid fertilizer with a coating material comprising an aqueous emulsion of a thermoplastic resin and a melamine resin, and heating the coated fertilizer at 70° C. or higher.

DESCRIPTION OF THE INVENTION

Figure 1:
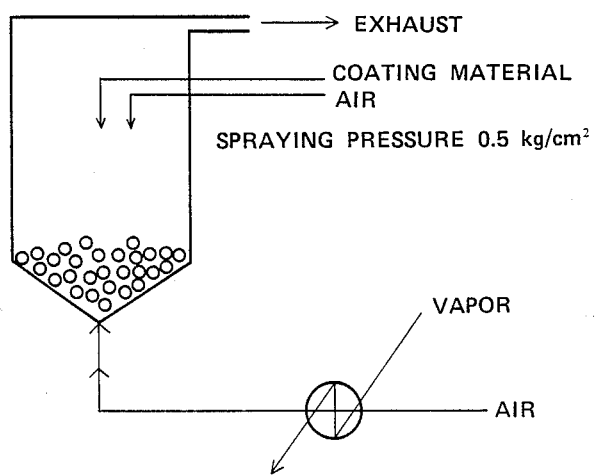
FIG. 1 is a schematic view of a coating apparatus of fluidized bed type used in Examples and Comparative Examples.

The present invention provides (1) a gradually effective fertilizer prepared by coating a solid fertilizer with a coating material comprising an aqueous emulsion of a resin as the main component and having a glass transition temperature of 60° C. or higher.

As used herein, the glass transition temperature of the coating material means a glass transition temperature of an actual coating film obtained by coating the fertilizer with a coating material, including a glass transition temperature of a coating film in case of coating the fertilizer with a resin alone and a glass transition temperature of a coating film in each case of coating the fertilizer with a mixture of a resin and a film-forming aid, etc.

The gradually effective, coated fertilizer of (1) can be prepared by spraying a coating material onto a granular fertilizer by means of usually used coating apparatus of fluidized bed type, coating apparatus of rotary drum type, etc., and thereby coating the solid fertilizer with the coating material.

As the emulsion of a resin to be used in preparing the coated fertilizer (1), any aqueous emulsion of homopolymer or copolymer, prepared by polymerizing one or plural species selected from the following monomers can be used alone or in combination, so long as it has a glass transition temperature of 60° C. or higher:

1. The aromatic vinyl compounds, typified by styrene;

2. The unsaturated carboxylic acids such as acrylic acid, methacrylic acid, crotonic acid, fumaric acid and itaconic acid, and salt or ester thereof;
3. The ester prepared by reacting an alcohol having a functional group with an unsaturated carboxylic acid, such as glycidyl methacrylate, 2-hydroxyethyl acrylate, and 2-hydroxypropyl acrylate;
4. The vinyl carboxylic ester typified by vinyl acetate;
5. The vinyl cyanide compounds typified by acrylonitrile;
6. The vinyl amide compounds typified by acrylamide and methacrylamide;
7. The aliphatic dienes typified by butadiene;
8. The olefin compounds such as ethylene, propylene and iso-butylene;
9. The halogen-substituted, vinyl compounds typified by vinyl chloride and vinylidene chloride; and
10. The di- or tri-vinyl compounds such as divinylbenzene, 1,4-butanedioldiacrylate and trimethylolpropane triacrylate.

In preparing the aqueous emulsion, the thermal decomposition initiator such as persulfate, the Fenton reagent of persulfate-ferrous system and hydrogen peroxide-ferrous system, the redox intiator such as persulfate-sodium thiosulfate system, persulfate-sodium hydrogen sulfite system, hydrogen peroxide-oxycarboxylic acid system, etc. can be used as the polymerization initiator. Furthermore, as the emulsifier, ordinary polymer emulsifiers and emulisfiers having a low molecular weight can be used, and particularly a good effect can be obtained when the two kinds of emulsifiers are used in combination. The polymer emulsifier includes water-soluble alkyd resin, etc., and the emulsifier having a low molecular weight includes anionic emulsifiers such as fatty acid salts, higher alcohol-sulfate esters, alkyl arylsulfonate, etc. and non-ionic emulsifiers such as polyoxyethylenealkyl ethers, polyoxyethylenealkylphenol ethers, polyoxyethylenealkyl esters, etc.

Fertilizer grains coated with an emulsion of a resin having a lower glass transition temperature than 60° C. are liable to become caking. The caking is more liable to take place with an emulsion having a glass transition temperature lower than 40° C., and the coated fertilizer grains become caking, even if they are left standing at room temperature.

The preferred amount of coating resin is 2 to 15% by weight on the basis of the fertilizer. If it is less than 2% by weight, no satisfactory coating effect can be obtained, and the gradual releasability is not expected, whereas, if it is more than 15% by weight, the cost of production is raised, and the ratio of the coating material to the coated fertilizer is too high. Thus, it is not practical.

The dissolution rate of the effective components of the fertilizer can be adjusted by changing the coating ratio. The dissolution rate is also varied by changing the species of the emulsion of resin to be mixed in a mixture comprising plural emulsions of resins and/or changing the species of the monomer constituting an emulsion of resin, and thus can be adjusted. In order to improve the film formability of emulsion particles, if necessary, in the process for forming a coating film, it is possible to use a film-forming aid and/or a plasticizer at the same time. As the film-forming aid and/or plasticizer, usually-employed film-forming aid or plasticizer can be used, and specifically, butylcarbitol, butylcellosolve, phenylcellosolve, dibutyl phthalate, dioctyl phthalate, butylcarbitol acetate, xylene, benzyl alcohol, hexyleneglycol, hexylcellosolve, 2-ethylhexyl-cellosolve, octylcellosolve, etc. can be exemplified.

The preferred amount of a film-forming aid or a plasticizer depends upon the glass transition temperature of the emulsion of a resin as used, and is generally 2 to 30% by weight on the basis of the resin solid content. If the amount of the film-forming aid or plasticizer is too small, formation of satisfactorily continuous coating film cannot be promoted because of poor film formability of resin, and the gradual releasability cannot be expected. To the contrary, when it is too large, the coating treatment temperature is lowered and the coating treatment is deteriorated. The resulting coated fertilizer grains are liable to become caking, and what is worse, the cost of production is raised.

In a coating system having a weak resistance to caking, the caking can be considerably prevented by spreading aerozil, talc, etc. over the resulting coated fertilizer.

Further, the present invention provides (2) a gradually effective fertilizer prepared by coating a solid fertilizer with a coating material comprising an aqueous emulsion of a thermoplastic resin and a melamine resin as the main components, and heating the coated fertilizer at 70° C. or higher.

The gradually effective, coated fertilizer of the present invention can be prepared by spraying a coating material onto a granular fertilizer by means of usually used coating apparatus of fluidized bed type, coating apparatus of rotary drum type, etc., thereby coating the solid fertilizer with the coating material, and subjecting the coated fertilizer to heat treatment at 70° C. or higher.

Any solid fertilizer of powdery form, granular form or pellet form can be used, so long as it can be coated with a resin.

As the aqueous emulsion of thermoplastic resin to be used in preparing the coated fertilizer (2), an aqueous emulsion of homopolymer or copolymer, prepared by polymerizing one or plural species selected from the following monomers can be used alone or in combination:

1. The aromatic vinyl compounds, typified by styrene;
2. The unsaturated carboxylic acids such as acrylic acid, methacrylic acid, crotonic acid, fumaric acid and itaconic acid, salt or esters thereof;
3. The ester prepared by reacting an alcohol having an functional group with an unsaturated carboxylic acid, such as glycidyl methacrylate, 2-hydroxyethyl acrylate and 2-hydroxypropyl acrylate;
4. The vinyl carboxylic ester typified by vinyl acetate;
5. The vinyl cyanide compounds typified by acrylonitrile;
6. The vinyl amide compounds typified by acrylamide and methacrylamide;
7. The aliphatic dienes typified by butadiene;
8. The olefin compounds such as ethylene, propylene and iso-butylene;
9. The halogen-substituted vinyl compounds typified by vinyl chloride and vinylidene chloride; and
10. The di- or tri-vinyl compounds such as divinylbenzene, 1,4-butanedioldiacrylate and trimethylolpropane triacrylate.

In preparing the aqueous emulsion, the thermal decomposition initiator such as persulfate, the Fenton reagent of persulfate-ferrous system and hydrogen peroxide-ferrous system, the redox initiator such as persulfate-sodium thiosulfate system, persulate-sodium hydrogen sulfite system, hydrogen peroxide-oxycarboxylic acid system, etc. can be used as the polymerization initiator. Furthermore, as the emulsifier, ordinary polymer emulsifiers and emulsifiers having a low molecular weight can be used, and particularly a good effect can be obtained when the two kinds of emulsifiers are used in combination. The polymer emulsifier includes water-soluble alkyd resin, etc., and emulsifier having a low molecular weight includes anionic emulsifiers such as fatty acid salts, higher alcohol-sulfate esters, alkylarylsulfonate, etc. and non-ionic emulsifiers such as polyoxyethylenealkyl ethers, polyoxyethylenealkylphenol ethers, polyoxyethylenealkyl esters, etc.

In order to improve the film formability of emulsion particles in these systems, if necessary, in the process for forming a coating film, it is possible to use a film-forming aid and/or a plasticizer at the same time. As the film-forming aid and/or plasticizer, usually-employed film-forming acid or plasticizer can be used, and specifically, butylcarbitol, butylcellosolve, phenylcellosolve, hexylcellosolve, octylcellosolve, dibutyl phthalate, dioctyl phthalate, butylcarbitol acetate, xylene, benzyl alcohol, hexyleneglycol, etc. can be exemplified.

The preferred amount of a film-forming aid or plasticizer depends upon the glass transition temperature of the emulsion of a resin as used, and is generally 2 to 30% by weight on the basis of the resin solid content. If the amount of a film-forming aid or a plasticizer is too small, formation of satisfactorily continuous coating film cannot be promoted because of poor film formability of resin, and the gradual releasability cannot be expected. To the contrary, when it is too large, the coating treatment temperature is lowered and the coating treatment is deteriorated. The resulting coated fertilizer granules are liable to become caking, and what is worse, the cose of production is raised.

As the melamine resin, such melamine resins as various methylated melamine resins, various butylated melamine resins, various melamine-urea condensated resin etc. can be used. For eample, NIKALACK® MW-12, 22, 30, 40 (SANWA CHEMICAL CO., LTD.), Sumimal® M-50W, 40W, 30W, M-100, MD101 (SUMITOMO CHEMICAL CO., LTD.), SUMIREZ RESIN® 613 (SUMITO CHEMICAL CO., LTD.) and CYMEL® 300, 301, 303 (American Cyanamid Company) are exemplified. The amount of the melamine resin is preferably used in a range of 2 to 35% by weight on the basis of the solid content of the emulsion resin. When it is less than 2% by weight, the effect on the prevention of coated fertilizer from the caking by cross-linking reaction is lessened, whereas, to the contrary, when it exceeds 35% by weight and the amount of unreacted melamine resin is increased, a negative effective on the gradual releasability is manifested.

In order to obtain both the gradual releasability and the effect on the prevention of caking in a system containing the melamine resin, it is necessary to assure further progress of the cross-linking reaction of the melamine resin by heat treatment. As the heat treatment condition for this purpose, a higher temperature and a longer period are preferable. Generally, a temperature of 70° to 120° C. and a period of 30 to 60 minutes are appropriate as the heat treatment condition.

In a resin system having a low softening temperature, the coated fertilizer grains sometimes become caking while the temperature is elevated up to 70° C. in the heat treatment process. In order to avoid such caking, the coated fertilizer is preferably treated with fine powders of aerozil, talc, etc. after the completion of coating to spread the fine powders onto the surface of fertilizer grains, and then subjected to the heat treatment.

The amount of coating resin is preferably 2 to 15% by weight on the basis of the fertilizer. If it is less than 2% by weight, no satisfactory coating effect can be obtained, and the gradual releasability is not expected, whereas, if it is more than 15% by weight, the cost of production is raised, and the ratio of the coating material to the coated fertilizer is too high.

The dissolution rate of the effective components of the fertilizer can be adjusted by changing the coating ratio. The dissolution rate is also varied by changing the species of the emulsion of resin to be mixed in a mixture comprising plural emulsions of resins and/or changing the species of the monomer constituting an emulsion of resin, and thus can be adjusted thereby.

The present invention is described, referring to Examples. Compositions of aqueous emulsions of resins used in Examples and Comparative Examples are shown in Table 1 and Table 2:

TABLE 1

| Aqueous emulsion | | A | B | C | D | E |
|---|---|---|---|---|---|---|
| Monomer | Styrene | 359 | 302 | | 189 | |
| | Butyl methacrylate | | 57 | | 140 | |
| | 2-ethylhexyl methacrylate | 11.5 | | | 49 | |
| | Butyl acrylate | | | 38 | | |
| | Methyl methacrylate | | | 321 | | |
| | Methacrylic acid | 7.5 | 19 | 19 | | |
| | Vinyl acetate | | | | | 396 |
| Emulsifier | Gl-4 | 28.6 | 28.6 | 28.6 | 28.6 | |
| | Nissan Nurex R | 4 | 4 | 4 | 4 | 8 |
| Polymerization initiator | Ammonium persulfate | 1 | 1 | 1 | 1 | 1 |
| Water | | 588.4 | 588.4 | 588.4 | 588.4 | 595 |
| Glass transition temperature of coated film (°C.) | | 65 | 63 | 75 | 38 | 32 |

Unit: Parts by weight
Gl-4: Polymer emulsifier, made by Kyowa Hakko Kogyo Co., Ltd., Japan. (Solid content: 70%)
Nissan Nurex R: Made by Nippon Oil and Fats Co., Ltd. (Solid content: 50%)

The aqueous emulsions A, B, C, D and E are prepared in the following manner.

An emulsifier and water are put into a reactor, stirred, and heated to 80° C. Ten percent of the monomer is initially added thereto. Then, 90% of the aqueous solution of the polymerization initiator is added thereto. After a while, the remaining amount of the monomer is dropwise added thereto. The dropwise addition is completed in about 3 hours, and then the remaining amount of the aqueous solution of the polymerization initiator is added thereto. Aging is carried out for one hour. The reaction temperature is constantly kept at about 80° C. After the completion of the reaction, the reaction mixture is cooled, neutralized with ammonia water and filtered through filter cloth.

The glass transition temperature of the coated film is determined by scraping a coating film from the coated fertilizer prepared in Examples and measuring the scraped coating film with a DSC measuring apparatus, made by Seiko Instruments and Electronics Ltd. at a temperature-elevating rate of 10° C./min.

Figure 3:
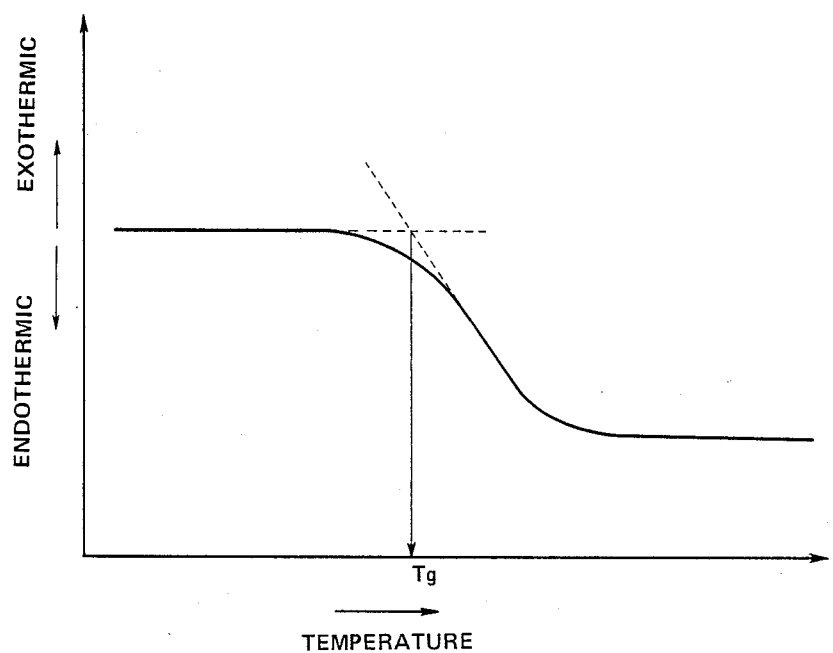
FIG. 3 is a chart showing how to determine in the glass transition temperature (Tg) of the coating material.

The glass transition temperature is the temperature at the site indicated by an arrow on the chart of FIG. 3.

TABLE 2

| Aqueous emulsion of resin | | F | G | H |
|---|---|---|---|---|
| Monomer | Styrene | 358 | 242 | 189 |
| | Butyl methacrylate | | 121 | 140 |
| | 2-hydroxyethyl methacrylate | 11.5 | | |
| | 2-ethylhexyl methacrylate | | | 49 |
| | Methacrylic acid | 7.5 | 15 | |
| Emulsifier | Gl-4 | 28.6 | 28.6 | 28.6 |
| | Nissan Nurex R | 6 | 4 | 4 |
| Polymerization initiator | Ammonium persulfate | 1 | 1 | 1 |
| Water | | 587.4 | 588.4 | 588.4 |
| Glass transition temperature (° C.) | | 85 | 65 | 40 |

Unit: parts by weight
Gl-4: Polymer emulsifier, made by Kyowa Hakko Kogyo Co., Ltd., Japan. (Solid content: 70%)
Nissan Nurex R: Made by Nippon Oil and Fats Co., Ltd. (Solid content: 50%)

Emulsifiers Gl-4 and Nissan Nurex R, and water are put into a reactor, stirred under nitrogen atmosphere, and heated to 80° C. Ten percent of the monomer is initially added thereto. Then, 90% of the aqueous solution of ammonium persulfate as the polymerization initiator is added thereto. After a while, the remaining amount of the monomer is dropwise added thereto. The dropwise addition is completed in about 3 hours, and then the remaining amount of the polymerization initiator is added thereto. Aging is carried out for one hour. The reaction temperature is constantly kept at about 80° C. After the completion of the reaction, the reaction mixture is cooled, neutralized with ammonia water and filtered through filter cloth.

The glass transition temperature is a value obtained by measurement with a DSC measuring apparatus, made by Seiko Instruments and Electronics Ltd. at a temperature-elevating rate of 10° C./min.

The present invention is applicable to various solid fertilizers in a powdery form, a granular form, a pellet form, etc., and particularly preferably applicable to granular fertilizer. As the granular fertilizer, Rinshoankari (Ammonium Potassium Phosphate-Nitrate) No. 1 (made by Asahi Chemical Industry Co., Ltd.), Enkarinan (Ammonium Potassium Phosphate-Chloride) No. 1 and High Analysis Mixed Fertilizer No. 777 (made by The Nippon Chemical Industries Co., Ltd.), KH12-8-10 (made by Kyowa Hakko Kogyo Co., Ltd.), etc. can be exemplified.

In the following Examples, KH12-8-10 was used, and coated fertilizer was prepared in a coating apparatus shown in FIG. 1.

Examples of the present invention and Comparative Examples are given below:

EXAMPLE 1

A coating material having the following composition was coated onto 500 parts by weight of granular fertilizer at about 80° C.:

| | |
|---|---|
| Aqueous emulsion A (solid content: 40%) | 125 parts by weight |
| Film-forming aid: octylcellosolve | 14 parts by weight |
| Water | 28 parts by weight |

EXAMPLE 2

A coating material having the following composition was coated onto 500 parts by weight of granular fertilizer at about 75° C.:

| | |
|---|---|
| Aqueous emulsion B (solid content: 40%) | 125 parts by weight |
| Film-forming aid: hexylcellosolve | 7 parts by weight |
| Water | 35 parts by weight |

EXAMPLE 3

A coating material having the following composition was coated onto 500 parts by weight of granular fertilizer at about 80° C.:

| | |
|---|---|
| Aqueous emulsion C (solid content: 40%) | 125 parts by weight |
| Film-forming aid: butylcarbitol | 14 parts by weight |
| Water | 28 parts by weight |

COMPARATIVE EXAMPLE 1

A coating material having the following composition was coated onto 500 parts by weight of granular fertilizer at about 43° C.:

| | |
|---|---|
| Aqueous emulsion D (solid content: 40%) | 125 parts by weight |
| Water | 42 parts by weight |

COMPARATIVE EXAMPLE 2

A coating material having the following composition was coated onto 500 parts by weight of granular fertilizer at about 35° C.:

| | |
|---|---|
| Emulsion E of vinyl acetate (NV 40%) | 125 parts by weight |
| Water | 42 parts by weight |

The coated fertilizers obtained in Examples 1 to 3 remained unchanged at 40° C. even under a load of 250 g/cm$^2$, whereas the fertilizer granules of comparative Examples 1 and 2 become caking under the same conditions as above.

Figure 2:
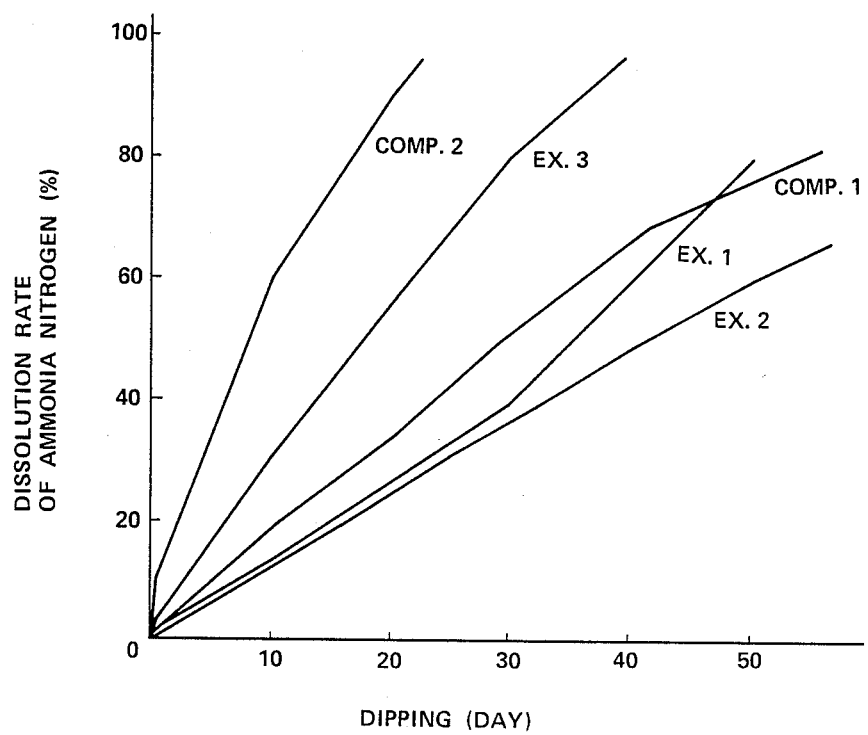
FIG. 2 shows dissolution rates of coated fertilizers prepared in Examples 1–3 and Comparative Examples 1–2, where Ex. 1–3 and Comp. 1–2 correspond to Examples 1–3 and Comparative Examples 1–2, respectively.

Gradual releasability is illustrated in FIG. 2, where the dissolution rate of ammonia nitrogen is given when 10 g of each of coated fertilizers obtained in Examples 1 to 3 and Comparative Examples 1 and 2 was dipped in 200 ml of water at 30° C.

EXAMPLE 4

A coating material having the following composition was coated onto 100 parts by weight of granular fertilizer at about 80° C. and the coated fertilizer was heated at 100° C. for drying for one hour after the completion of coating:

| | |
|---|---|
| Aqueous emulsion F (solid content: 40%) | 25 parts by weight |
| Film-forming aid, butylcarbitol | 2.8 parts by weight |
| Melamine resin: Sumimal M-30W, made by Sumitomo Chemical Company, Limited. | 1.3 parts by weight |

-continued

| | |
|---|---|
| Water | 10.9 parts by weight |

EXAMPLE 5

A coating material having the following composition was coated onto 100 parts by weight of granular fertilizer at about 43° C., and the coated fertilizer was sprayed with 0.1 part by weight of talc after the completion of coating and heated at 100° C. for one hour for drying:

| | |
|---|---|
| Aqueous emulsion G (solid content: 40%) | 25 parts by weight |
| Film-forming aid, butylcarbitol | 1.4 parts by weight |
| Melamine resin: Sumimal M-30W | 1.3 parts by weight |
| Water | 12.3 parts by weight |

EXAMPLE 6

A coating material having the following composition was coated onto 100 parts by weight of granular fertilizer at about 80° C. and the coated fertilizer was heated at 100° C. for one hour for dryig after the completion of coating:

| | |
|---|---|
| Aqueous emulsion H (solid content: 40%) | 13.7 parts by weight |
| Aqueous emulsion of styrene-butadiene copolymer, JSR-0592, made by Japan Synthetic Rubber Co., Ltd. (solid content adjusted to 40%) | 11.3 parts by weight |
| Film-forming aid: butylcarbitol | 0.8 parts by weight |
| Melamine resin: Sumimal M-30W | 1.3 parts by weight |
| Water | 12.9 parts by weight |

COMPARATIVE EXAMPLE 3

A coating material having the following composition was coated onto 100 parts by weight of granular fertilizer at about 80° C.:

| | |
|---|---|
| Aqueous emulsion F (solid content: 40%) | 25 parts by weight |
| Film-forming aid, butylcarbitol | 2.8 parts by weight |
| Water | 12.2 parts by weight |

COMPARATIVE EXAMPLE 4

A coating material having the following composition was coated onto 100 parts by weight of granular fertilizer at about 43° C.:

| | |
|---|---|
| Aqueous emulsion G (solid content: 40%) | 25 parts by weight |
| Film-forming aid, butylcarbitol | 1.4 parts by weight |
| Water | 13.6 parts by weight |

The coated granular fertilizers obtained in Examples 4 to 6 remained unchanged without caking when left standing at 60° C. under a load of 250 g/cm$^2$ for one day. In comparative Example 3, slight degree of caking occurred under the same condition, and in Comparative Example 4, caking occurred even at room temperature.

Figure 4:
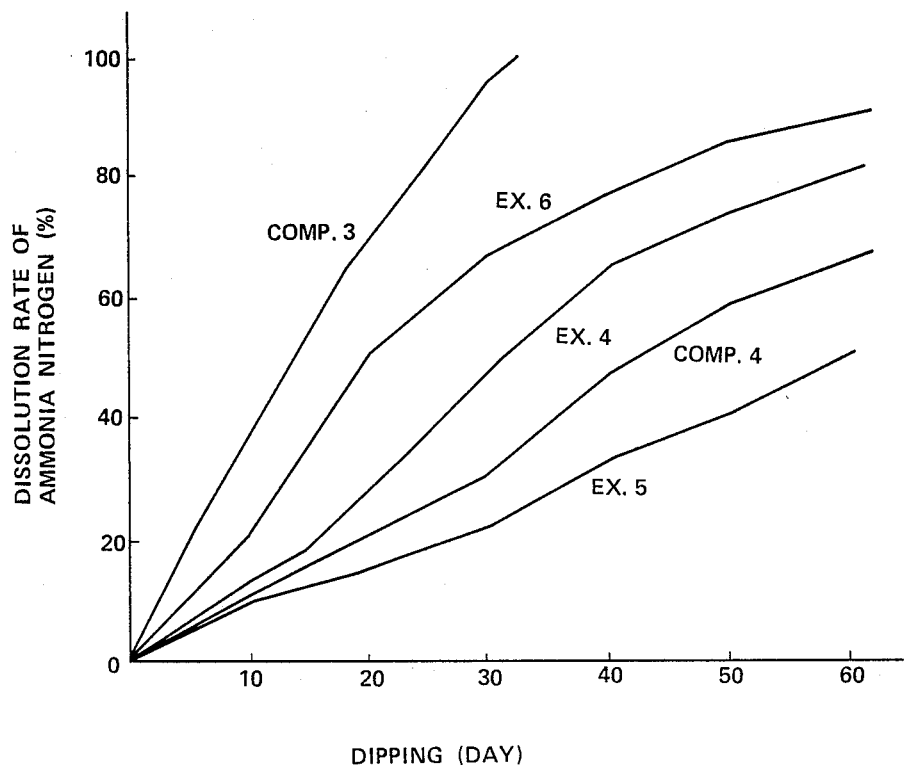
FIG. 4 shows dissolution rates of coated fertilizers prepared in Examples 4–6 and comparative Examples 3 and 4, where Ex. 4, Ex. 5 and Ex. 6 and Comp. 3 and Comp. 4 correspond to Examples 4, 5 and 6 and Comparative Examples 3 and 4, respectively.

Gradual releasability is given in FIG. 4, where the dissolution rate of ammonia nitrogen is shown for each coated fertilizer when 10 g of coated fertilizers obtained in Examples was dipped in 20 ml of water at 30° C.

What is claimed:

1. A solid fertilizer which is obtained by coating the fertilizer with a coating material comprising an aqueous emulsion of a thermoplastic resin, and a melamine resin and heating the coated fertilizer at 70° C. or higher; the amount of the coating material being in a range of 2 to 15% by weight based on the fertilizer, and the amount of the melamine resin being in a range of 2 to 35% by weight based on the solid content of the aqueous emulsion of the thermoplastic resin.

2. The fertilizer according to claim 1, wherein the coating material further comprises a film-forming acid and/or a plasticizer.

3. The fertilizer according to claim 1, wherein the aqueous emulsion of the thermoplastic resin is an aqueous emulsion of homopolymer or copolymer, which is prepared by polymerizing one or plural monomer(s) selected from the group consisting of aromatic vinyl compounds, unsaturated carboxylic acids and salts or ester thereof, ester prepared by reacting alcohol having a functional group with unsaturated carboxylic acid, vinyl carboxylic acid ester, vinyl cyanide compounds, vinyl amide compounds, aliphatic dienes, olefin compounds, halogen-substituted vinyl compounds and di- or tri-vinyl compounds; or a mixture of said aqueous emulsions of homopolymer or copolymer.

4. The fertilizer according to claim 1, wherein the melamine resin is selected from the group consisting of methylated melamine resin, butylated melamine resin and melamine-urea condensated resin.

5. A fertilizer according to claim 1, wherein the coated fertilizer is heated at a temperature of 70° to 120° C. for a period of from 30 to 60 minutes.

6. The fertilizer according to claim 1, wherein the coated fertilizer is further treated with talc or aerozil prior to the heat treatment.

* * * * *